United States Patent [19]

Fogelman et al.

[11] 4,440,457

[45] Apr. 3, 1984

[54] UNIVERSAL ELECTRONIC VIDEO GAME CABINET

[75] Inventors: H. Frank Fogelman; Arnum Ambrose, both of San Diego, Calif.

[73] Assignee: Sega Electronics, Inc., San Diego, Calif.

[21] Appl. No.: 310,520

[22] Filed: Oct. 13, 1981

[51] Int. Cl.³ .............................................. A47B 81/06
[52] U.S. Cl. ...................................... 312/7.2; 312/7.1; 312/223; 358/254
[58] Field of Search .................. 312/7.2, 7.1, 223, 107, 312/111, 35; 358/254

[56] References Cited

U.S. PATENT DOCUMENTS

| | | | |
|---|---|---|---|
| 1,727,558 | 9/1929 | Price | 312/7.1 |
| 2,543,146 | 2/1951 | Bace | 312/7.2 |
| 2,604,536 | 7/1952 | Rose | 312/7.2 |
| 2,643,169 | 6/1953 | Wells et al. | 312/35 |
| 3,245,738 | 4/1966 | MacMahon et al. | 312/35 |
| 3,294,905 | 12/1966 | Jonassen | 312/7.2 |
| 3,541,256 | 11/1970 | Anders | 358/254 |
| 3,853,366 | 12/1974 | Kesling et al. | 312/223 |
| 4,084,194 | 4/1978 | Hector | 358/254 |
| 4,202,586 | 5/1980 | Oplinger | 312/107 |
| 4,245,871 | 1/1981 | Rex | 312/223 |

Primary Examiner—Victor N. Sakran
Attorney, Agent, or Firm—Brown & Martin

[57] ABSTRACT

An electronic video game cabinet includes an upstanding box-like structure defining a cabinet having an electronics compartment and a coin compartment with separate access doors through the front panel of the cabinet for separate and independent access to the electronics and coin compartments, with a removable video monitor mounting panel in the upper portion of the front panel and a removable control panel below and forward of the video monitor panel with removable display panel surrounding the video monitor and on an upper front panel above the video monitor all arranged to provide for rapid conversion of games within the cabinet.

14 Claims, 9 Drawing Figures

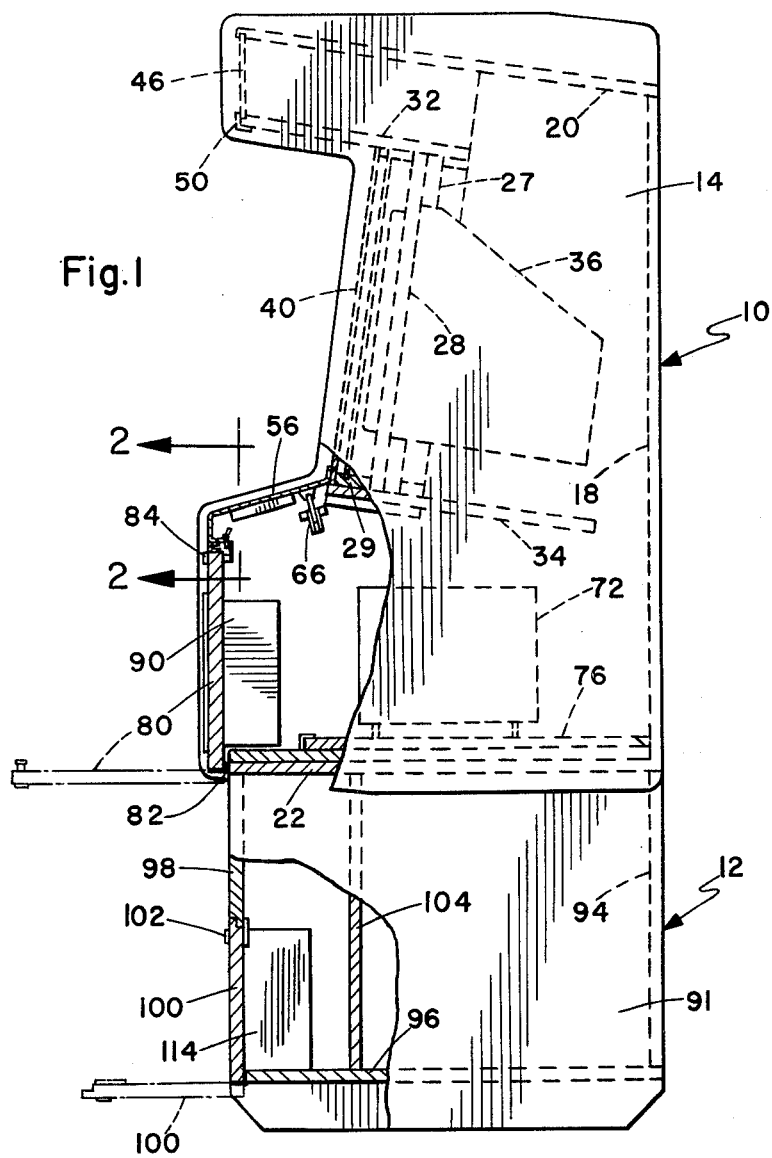
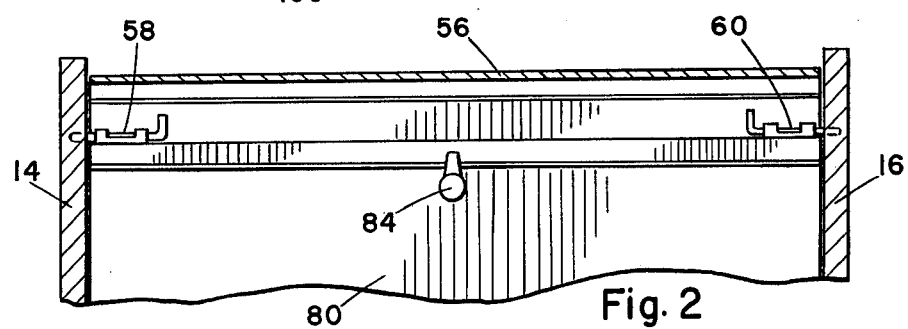

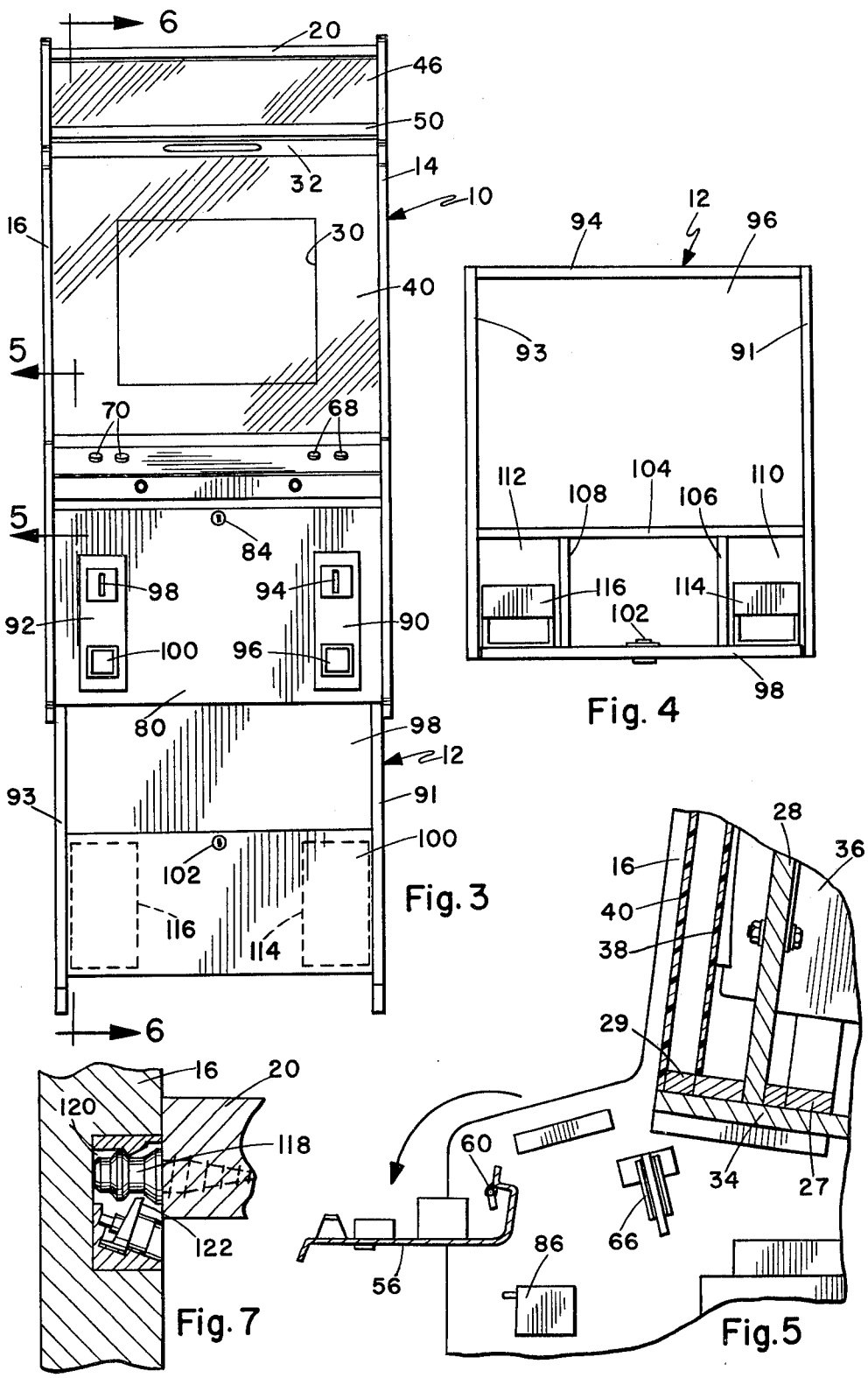

UNIVERSAL ELECTRONIC VIDEO GAME CABINET

BACKGROUND OF THE INVENTION

The present invention relates to cabinets and pertains particularly to a universal electronic video game cabinet having a means for providing quick change of the electronic game and the identifying display information related thereto.

Electronic video games wherein one or more players play either against each other or against the machine have become quite popular and come into wide spread use in recent years. Such games permit quite versatile programming and can provide realistic graphic display as well as sound effects. Such games have been found to have a great deal of educational and training value in that they aid in the development of coordination skills, as well as planning and strategy skills.

Complete electronic video game units are normally mounted within a cabinet having a height that permits the player to stand and manipulate controls while viewing the video display on a cathode ray tube. The game program is normally embodied within one or more chips or electronic cards that is mounted within the cabinet. The entire cabinets and game assemblies are normally mounted within cabinets at the factory and access for repair of the electronics or other components within the cabinet are normally provided by an access door or removably panel in the rear of the cabinet. This has the disadvantage that should a machine break down, it must be removed from its normal position against the wall in a game room to permit access to the access door for repair or replacement of components therein. Quite frequently, due to the inconvenience and the problem of and difficulty of replacement of parts, the entire machine is returned to the factory or a repair facility for maintenance and repair. This is expensive for the game room operator because of the necessary down time of the machine.

Another disadvantage of the conventional cabinets is that thieves, while gaining access to the cash box, quite frequently damage the electronic components of the machine. This requires shipment of the machine to the factory for repair or replacement.

Another disadvantage of such machines is that as players become skilled at playing the game and can attain high scores, he either loses interest in that game or plays it for hours at a time on a single coin. Moreover, players become rapidly bored with playing the same game and desire quite a variety of games. Such games, therefore, have a relatively short life and are quickly abandoned by the public in favor of newer games. This forces the game room operator to trade-in the old machine for machines having the new game or in the alternative, ship the machine to the factory for converting to the latest games. The down time, as a result of the aforementioned problems, can be quite costly to the game room operator.

Accordingly, it is desirable that a game cabinet be available which reduces or eliminates that above problems of the prior art machines by providing a construction that permits quick and easy access to the components therein for replacement or repair.

SUMMARY AND OBJECTS OF THE INVENTION

It is therefore the primary object of the present invention to provide an improved electronic video game cabinet, having an improved access and improved means for rapid change of the game.

In accordance with the primary aspect of the present invention, an electronic video game cabinet is provided with separate compartments for separating the electronics and the coin box and with separate access to each to prevent damage to the electronics with unauthorized access to the coin box and further including frontal access to the electronics to permit quick replacement of game cards and chips and further including replacable control panels as well as display panels for quick and rapid in situ conversion of electronic video games.

Another aspect of the invention includes knock-down construction of the cabinet to provide easy assembly and disassembly for ease of shipment of the machines.

BRIEF DESCRIPTION OF THE DRAWINGS

The above and other objects and advantages of the present invention will become apparent from the following description when read in conjunction with the drawings wherein:

FIG. 1 is a side elevational view, with portions cut away, of a preferred embodiment of the invention.

FIG. 2 is an enlarged sectional view taken on line 2—2 of FIG. 1.

FIG. 3 is a front elevational view of the embodiment of FIG. 1.

FIG. 4 is a top plan view of the detachable lower portion of the cabinet.

FIG. 5 is an enlarged sectional view taken on line 5—5 of FIG. 3.

FIG. 7 is an enlarged sectional view taken on line 7—7 of FIG. 6.

DETAILED DESCRIPTION OF PREFERRED EMBODIMENTS

Turning to the drawings, as best seen in FIGS. 1 and 3, the cabinet of the present invention is of a generally upstanding box-like configuration having internal partitions separating the interior of the cabinet into an upper electronics compartment and a lower coin compartment. This separation of these two compartments removes the electronic components from the danger of injury or damage during vandalism or theft from the coin box. As will also be appreciated and more fully detailed below, the compartments each have access openings with a closable and lockable closure at the front or through the front panel means of the cabinet. This permits access to the coin box and to the electronics components from the front of the cabinet without the necessity of pulling the cabinet from the wall or removing it from its normal playing location.

In addition, with plug-in cards or program chips for the electronics, the electronics game can be quickly changed simply by opening the door to the electronics compartment and removing one or more prior game chips or cards and replacing them with new cards or chips. In addition, provision is made for replacing the control panel as well as replacing display panels around the video monitor or cathode ray tube (CRT) (hereinafter called "video monitor") and at the front of the cabinet which indicate the game in the machine. This provides a universal cabinet which can be quickly and easily converted from one game to another simply by replacing the necessary game card and display panels, without the necessity of removing the cabinet to the factory or to a repair shop or the like.

In a preferred embodiment of the invention, the cabinet is made in separable two-part upper and lower cabinets that may be separated for ease of shipment. This separate cabinet construction also, more positively, separates the cash or coin box and compartment from the electronics compartment. Thus, any damage that may be done to the coin box does not effect the electronics in the electronics compartment.

Figure 6:
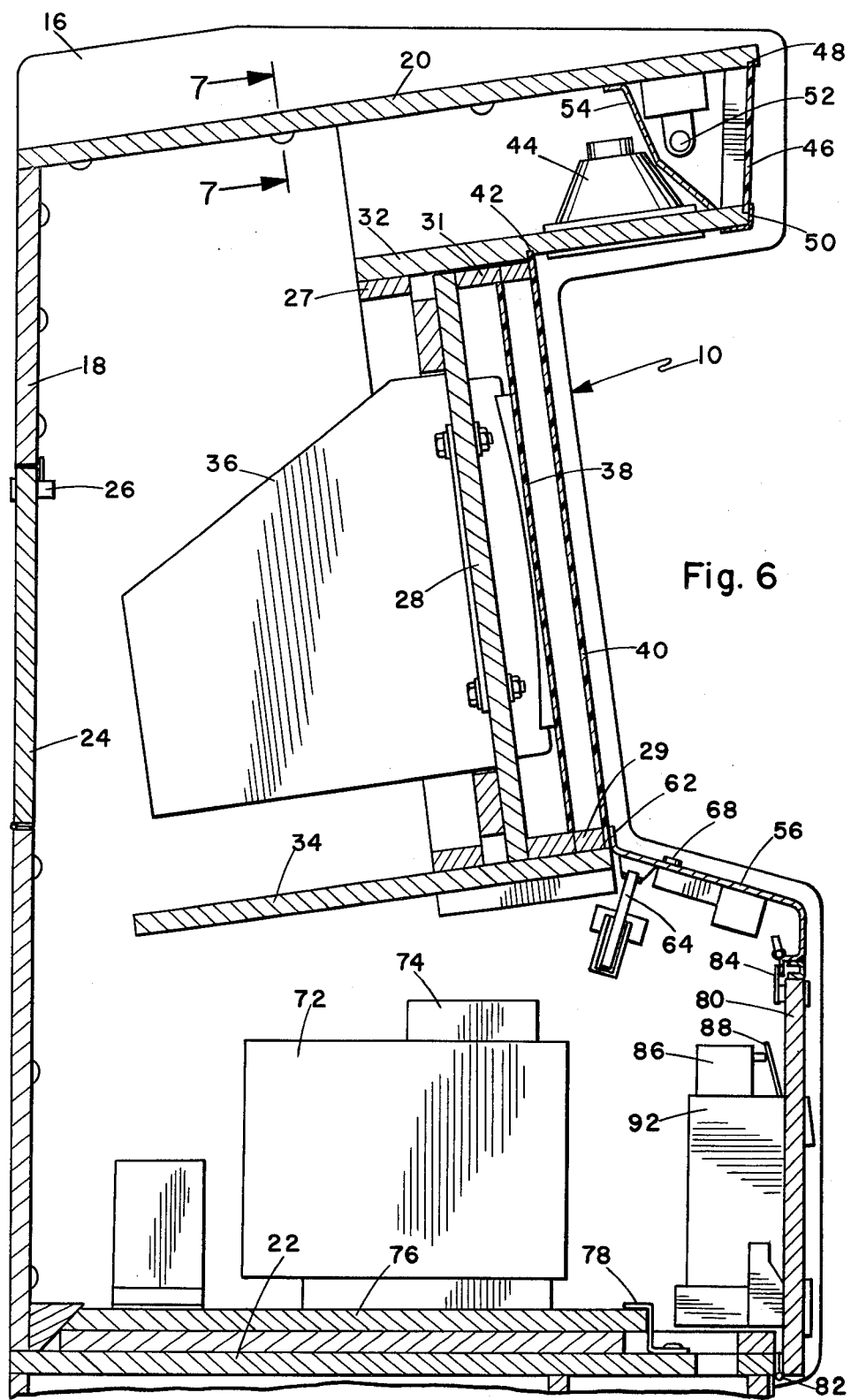
FIG. 6 is an enlarged sectional view taken on line 6—6 of FIG. 3.

With particular reference now to FIGS. 1 and 3, the cabinet comprises an upper cabinet 10 and a lower cabinet 12 with the upper cabinet mounted or resting directly on top of the lower cabinet and detachably secured thereto. With reference alternately to FIGS. 1, 3 and 6, the upper cabinet comprises a pair of side panels 14 and 16, with a back panel 18, a top 20 and a bottom 22 with front panel means comprising a plurality of panel sections all secured together in a fashion to form a generally box-like upstanding enclosed cabinet. The back panel 18 includes a door 24 (FIG. 6) hinged to the cabinet and including a lock 26 all providing access to the upper portion of the upper cabinet and to components within the interior thereof.

The side panels are shaped to provide, as best seen in FIGS. 1 and 6, a screen viewing area with an overhang area covered by a panel with a speaker and light compartment and a lower control console area below the video monitor mounting area. More particularly, the front panel assembly includes a video monitor mounting board 28 which has a generally rectangular cutout opening 30 (FIG. 8) for receiving a video monitor and is mounted at a slight angle to the vertical between an upper, generally horizontal, panel 32 and a lower, generally horizontal but slightly angled, panel 34 both of which are secured between the side panels.

The monitor is secured to a mounting frame 28 which is sandwiched between a removable mounting frame or board 31 and a fixed frame 27, secured to the side panels 14 and 16 and panels 32 and 34, and removable frame 29 at the front thereof. This permits the monitor in frame 28 to be removed and rotated or reoriented and replaced, all from the front. This permits vertical or horizontal orientation of the screen as required by the particular game. A graphics display panel 38 representative of the game in the machine is removably mounted in frame 29 and can be changed with the game. This display panel contains display and graphic material surrounding the screen and graphically illustrating and representing the particular game in the machine at the time. This panel is readily removable by pivoting of the control panel, as will be subsequently described, to permit this panel to be withdrawn and another panel quickly inserted in its place.

A video monitor 36 is mounted within the monitor mounting panel 28 with the screen thereof projecting or directed forward. The monitor is mounted at a slight angle to the vertical to provide a more comfortable or easy viewing position. The monitor is mounted at a convenient height that is a compromise to permit viewing by full grown adults as well as by children.

Positioned still forward of the video screen is a protective glass or plexiglass sheet 40 which is mounted within a groove 42 in the upper panel 32 and rests against a ledge formed by the outer or forward end of panel 34 and held in place by a tab 62 on the control panel, as will be described.

The upper cabinet panel 32 includes a speaker 44 mounted in an opening therein and projecting downward above the video screen from the overhang portion of the cabinet. This permits realistic sound effects to be projected in the vicinity of the player.

An additional information panel 46 (typically carrying the name andor Logo) is positioned at the forwardmost portion of the overhang and fitted within a groove 48 within the top panel 20 and held in place by a bracket 50. This panel can be quickly and easily removed simply by loosening the screws holding bracket 50 in place, letting it drop down and removing panel 46 and replacing it with a suitable display panel representative of the game in the machine. The panel is, preferably, constructed of a plexiglass or other suitable transparent material that permits back lighting from a light 52 contained within the cabinet. A light shield and/or reflector 54 is positioned behind the light 52 separating it from the speaker 44.

The entire cabinet as will be appreciated is separated into two main compartments, these being the electronics compartment formed in the upper cabinet 10 and a coin or money compartment, as will be described, in the lower cabinet 12.

The front panel assembly of the machine or cabinet includes a somewhat forwardly sloping control panel 56 (FIGS. 1 and 6) which is pivotally mounted by spring biased retractable pins 58 and 60 (FIG. 2) between the side panels 14 and 16 extend upward and includes an upwardly extending lip or flap 62 overlapping the lower edge of the screen cover 40 for retaining it in its position. A pair of quick release latches 64 and 66 are secured to the upper edge of the control panel 56 and latch the control panel in its close or operative position to the sides of the cabinet. Release of these latches permit the control panel to pivot or swing out to the open position as shown in FIG. 5 after door 80 has been opened.

The control panel includes the necessary manual control elements such as buttons 68 and 70, or other control elements such as joy sticks, rotary knobs, or rotating spheres that are interconnected through the electronics of the machine for controlling the player controlled elements or components of the game in the machine. Various games utilize different and various control members such as buttons, knobs, and joy sticks, such that when a game is changed within the machine it may be necessary to change the control elements. For this reason, the control panel 56 is detachably mounted within the cabinet for quick and convenient replacement when the game within the machine is replaced. Plug-in wire connectors, not shown, connect the various control components or elements to the electronics control system within the electronics compartment of the cabinet.

Mounted within the electronics compartment of the cabinet is the electronics control module 72 of a known construction, which includes provision for mounting of one or more game cards shown in phantom at 73 within the module and including a blower or fan 74. The electronics control module 72 is mounted on a board 76 which is held in place by brackets 78 on the bottom panel 22 of the cabinet for quick removal and replacement. Thus, the entire assembly can be quickly removed simply be removing bolts or screws holding brackets 78 in place. Cables or other electrical connections are then simply unplugged and a replacement control module is positioned in place of the defective module.

Access to this compartment is provided by means of an opening at the front of the cabinet which is covered by a closure member or door 80 which is connected at its lower edge by a hinge 82 to the cabinet and includes a lock 84 of a conventional type at the upper edge thereof for locking the door in a closed position. An interlock system, including an interlock switch 86 and an activator leaf 88 mounted on the door, inactivates the power to the electronics upon opening of the door 80.

Also mounted within the closure or door panel 80 is a pair of coin receiving and return mechanisms 90 and 92, each having, respectively, a coin receiving and return slot 94, 96 and 98 and 100. Coins inserted into these slots, if accepted, are passed through an opening in the bottom of the upper cabinet into the coin compartment of the lower cabinet 12 and into the coin box or boxes. The machine is setup to provide for one or more players, usually two, using one or more of the coin slots, depending on coin denomination or other factors. Additional coin slots may be provided for the machine for redundancy.

The above described upper cabinet is mounted directly on the top of a lower cabinet 12 which include a pair of side panels 91 and 93, a back panel 94, a bottom panel 96 and a front panel assembly including an upper fixed panel 98, and a lower hinged or door panel 100, all connected together to form a box-like open top structure. The front panel 100 includes a lock 102 and provides access to the coin box compartment. The lower cabinet includes a partition 104 together with partitions 106 and 108, forming a pair of separate coin box compartments 110 and 112, each of which contains a coin box 114 and 116, respectively, for receiving coins from the coin mechanism above. With this cabinet arrangement, should vandals or thieves break into the coin box area to take the coins, they would not ordinarily damage the electronics components within the separate electronics compartment.

Certain alternate constructions of the above described cabinet having incorporated therein the main features thereof may take the form of a unitary cabinet having single or common side panels for the upper and lower compartments such that a unitary cabinet is formed. Such can be easily accomplished simply by extension of the side panels and portions of the back panel as required.

Alternate modifications may be incorporated therein to form in either or the above described arrangements, a knock-down cabinet structure, which may be completely taken down quickly for shipment. Such panel may incorporate well known quick release connecting mechanisms as illustrated in FIG. 7 wherein cabinet panels alternately include pegs or pins 118 mounted therein and received in a bore 120 in an adjacent panel with a locking cam 122 adjacent the bore which rotates to a position of release or locking of the pin into position. These rotary cams, preferably operated by a screw driver, are located inside the cabinet structure for security reasons such that access may be gained thereto only through one or more of the locked closures or doors in the cabinet. With this knock-down arrangement, the entire cabinet can be quickly disassembled for shipment purposes and easily assembled at its destination.

Figures 8, 9:
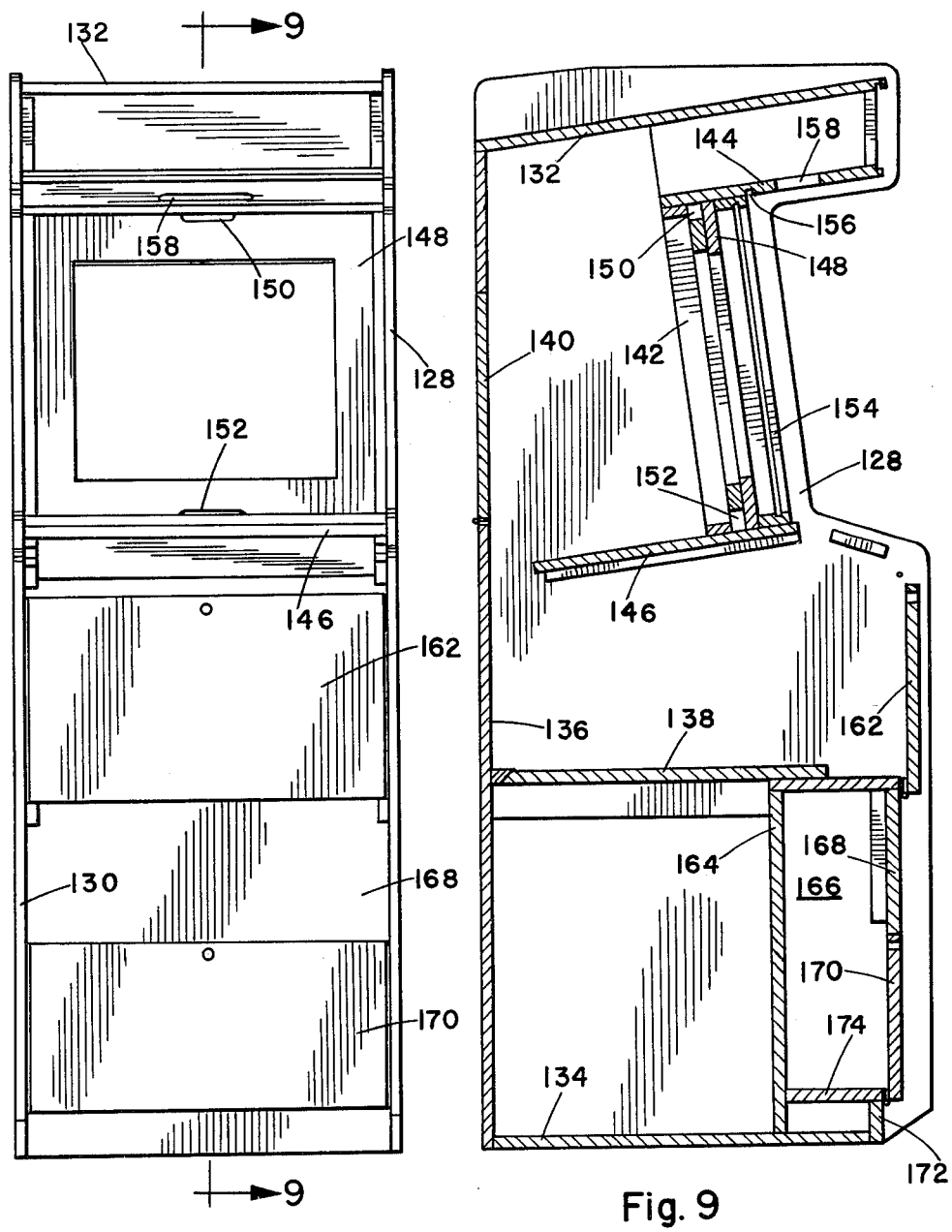
FIG. 8 is a front elevational view showing an alternate embodiment of the invention.
FIG. 9 is a sectional view taken on line 9—9 of FIG. 8.

Turning now to FIGS. 8 and 9 of the drawings, there is illustrated a unitary cabinet incorporating the major features of the present invention. This cabinet as illustrated includes a pair of opposed side panels 128 and 130, top and bottom panels 132 and 134, and a back panel 136 all cooperating with a front panel assembly to define a box-like vertical upstanding video cabinet structure. The side and back panels extend the full height from the floor, thus providing a unitary cabinet as opposed to the upper and lower two-piece cabinet as described in the previous embodiment. The cabinet is separated into an electronics component compartment and a coin or money compartment by means of a partition panel 138 substantially as in the previous embodiment.

An access door 140 in the back panel 136 provides access to the video mounting area of the cabinet for repair, adjustment, or the like, as required. The video mounting arrangement of the present cabinet is substantially identical to the previous embodiment with a video support frame 142 fixed between upper and lower, generally horizontal, panels 144 and 146. A monitor mounting board or frame 148, having a generally rectangular cutout for receiving the video monitor is mounted forward of the monitor support frame 142 and may be removed and reoriented as necessary for the particular game, as in the previous embodiment. This monitor mounting board or frame 148 includes upper and lower hand-receiving slots 150 and 152 to permit insertion of the hand to grasp the board and pull it forward out of the mounting bracket. A graphics display frame 154 includes a groove within which a graphic display panel is mounted, is positioned forward of the monitor mounting board 148, and is held in place by means of a protective glass as in the previous embodiment. A protective glass receiving groove 156 received the protective glass as in the previous embodiment which is held in its place by means of a lip on the pivoting control panel as in the previous embodiment.

The upper panel 144 extends forward and in conjunction with the top panel 132 forms a speaker enclosure with an opening 158 for mounting a speaker and includes, at the forward most end thereof, a graphics or logo display mounting groove 160 as in the previous embodiment.

The interior of the cabinet is divided into electronics compartment and a coin or cash compartment with a front access opening to the electronics compartment provided by a door or closure 162. The bottom of the cabinet is further divided by means of a partition 164 into a coin or cash compartment 166, which is enclosed by a fixed front panel 168 and a closure or door member 170 which is hinged at the bottom thereof to permit access to the coin or cash compartment. A kick panel 172 supports a bottom or floor panel 174 for the cash compartment.

While we have illustrated and described our invention by means of specific embodiments, it is to be understood that numerous changes and modifications may be made therein without departing from the spirit and scope of the invention as defined in the appended claims.

We claim:

1. A universal convertible electronic video game cabinet, said cabinet comprising:

front panel means, side panel means, and back panel means arranged and interconnected to define an upstanding box-like enclosure, partition means separating the interior of said cabinet into an exclusive electronics compartment and an exclusive coin compartment, said front panel means including an opening defined by a video mounting frame for mounting a video monitor with the video screen at a level for viewing from a standing position, a control panel for mounting manually manipulable control means detachably mounted by releasable latch means below and forward of said video mounting opening, a first access opening for providing restricted access solely to electronics components in said electronics compartment, and a second access opening in said front panel secured by second lockable closure means for providing restricted access solely to said coin compartment.

2. The game cabinet of claim 1 including mounting means for mounting a peripheral graphics display panel forward of and surrounding said video monitor and including releasable means releasably securing said panel in place.

3. The game cabinet of claim 2 wherein said releasable means comprises a flange on said control panel overlapping an edge of said display panel.

4. The game cabinet of claim 3 wherein access to said releasable latch means for removal of said contol panel is solely by way of said first lockable closure means in said front panel.

5. The game cabinet of claim 1, or 3, including an information display panel disposed above and forward of the video screen, said display panel being held in place by bracket accessible from the exterior of said cabinet.

6. The game cabinet of claim 1, or 4, wherein said cabinet is a two-piece cabinet having a lower cabinet defining said coin compartment and an upper cabinet detachably mounted on said lower cabinet for defining said electronics compartment.

7. The cabinet of claim 6, said first closure member includes at least one coin receiving and returning mechanism mounted therein including means for depositing acceptable coins in a coin box in said lower cabinet.

8. The game cabinet of claim 1 wherein said video mounting frame is removable and replaceable from the front of said panel.

9. The video game cabinet of claim 8 wherein said video mounting frame can be rotated 90 degrees about its axis for reorientating the video screen in either a vertical or horizontal orientation.

10. the cabinet of claim 9 wherein said video mounting frame is held in position by a graphics display frame which, in turn, is held in position by a protective glass screen.

11. The video cabinet of claim 10 wherein said control panel is pivotally mounted in said cabinet for pivoting about a horizontal axis and is pivotal between a retaining position for retaining said protective screen into position and to a releasable position for releasing said screen to permit removal of said protective screen, said display panel and said video mounting frame.

12. The cabinet of claim 11 wherein said video mounting frame includes hand slots at the edges thereof for handgrasping of said frame.

13. The cabinet of any one of claim 1, 4 or 12 wherein said side panel means are unitary panels.

14. The cabinet of claim 1, 4 or 12 wherein said panels forming said cabinet are secured together by quick release fasteners for defining a knock-down cabinet structure.

* * * * *